United States Patent [19]

Orain

[11] 4,291,552
[45] Sep. 29, 1981

[54] AXIAL RETAINING DEVICE IN PARTICULAR FOR A HOMOKINETIC TRIPOD JOINT

[75] Inventor: Michel A. Orain, Conflans Sainte Honorine, France

[73] Assignee: Glaenzer Spicer, Poissy, France

[21] Appl. No.: 933,743

[22] Filed: Aug. 15, 1978

[30] Foreign Application Priority Data

Sep. 5, 1977 [FR] France ............................. 77 26874
Jul. 26, 1978 [FR] France ............................. 78 22122

[51] Int. Cl.³ .............................................. F16D 3/30
[52] U.S. Cl. ................................................ 64/21; 64/8;
 403/57; 403/76; 403/335
[58] Field of Search .................. 64/21, 7, 8; 403/76,
 403/57, 335-338

[56] References Cited

U.S. PATENT DOCUMENTS

| | | | |
|---|---|---|---|
| 3,643,468 | 2/1972 | Kleinschmidt et al. | 64/8 |
| 3,805,551 | 4/1974 | Mangiavacchi et al. | 64/21 |
| 3,990,267 | 11/1976 | Orain | 64/21 |
| 4,000,629 | 1/1977 | Bellomo | 64/2 |

Primary Examiner—Ira S. Lazarus
Attorney, Agent, or Firm—Wenderoth, Lind & Ponack

[57] ABSTRACT

The device comprises a resilient fastener which has branches clipped on a first of the two elements of the homokinetic joint and serves to hold the second element of the joint assembled with the first element. One of the branches of the resilient member carries an adjustable abutment device which cooperates with a second abutment device on the first element. The fastener can be made to exert a prestressing force by adjustment of the adjustable abutment device. The adjustable abutment device may be a screw which is screwthreadedly engaged in a nut carried by the corresponding branch of the fastener and has an abutment surface which abuts an abutment surface formed on the first element.

22 Claims, 20 Drawing Figures

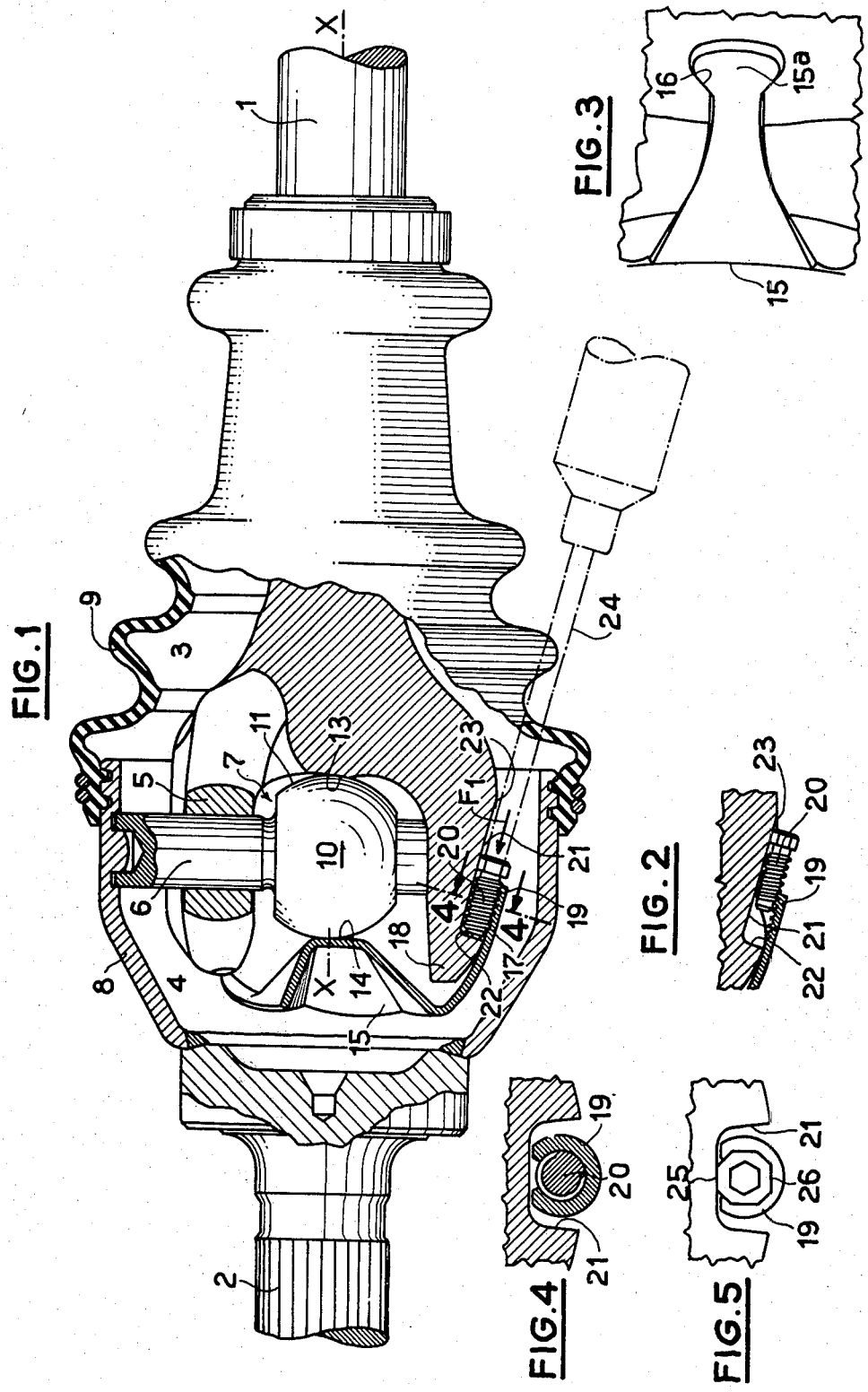

AXIAL RETAINING DEVICE IN PARTICULAR FOR A HOMOKINETIC TRIPOD JOINT

The present invention relates to axially retaining devices intended in particular for homokinetic joints of the tripod type. It is known that such joints comprise a first or tulip element rigid with one of the shafts or other means to be connected and defining raceways of part-circular section in which are received rollers rotatably and slidably mounted on trunnions of a second element in the shape of a tripod which is rendered rigid with the other shaft. Such joints permitting a large angular deviation between the shafts are also provided with a retaining device which prevents freedom of relative axial displacement or telescoping and increases the maximum operational angle of deviation of the joint. Generally, this axial retaining device comprises means disposed between the tripod element and the tulip element and allowing, on one hand, a swivelling movement and, on the other hand, a sliding movement between two planes which are parallel to each other and perpendicular to the axis of the tripod element or to the axis of the tulip element. A resiliently yieldable fastener in the shape of a muzzle clipped on the tulip element, ensures that the assembly is maintained axially. However, a necessary condition for a satisfactory operation of such an arrangement is the absence of play or preferably in the existence of a slight axial pre-stressing between the various parts of the joint, and this condition is difficult to achieve in mass-production, bearing in mind that the inevitable manufacturing tolerances in the different component parts are added to each other. Consequently, there is either an excessive clamping which may even prevent assembly, or an excessive play which may produce noise and wear in the course of operation of the joint.

An object of the present invention is to provide an axial retaining device which overcomes this drawback and provides the desirable absence of play or the desirable axial pre-stressing between the various parts without modifying the normal manufacturing tolerances and allowing a particularly easy assembly.

This result is obtained in a device for retaining a first element inside a second element which is in the shape of a tulip and has a plurality of branches, the device comprising a resiliently yieldable fastener having a plurality of branches the ends of which are engaged in recesses provided in the branches of the second element, wherein at least one of the branches of the fastener comprises at its end an adjustable abutment which cooperates with a complementary abutment provided on the associated branch of the second element.

In a preferred embodiment, this adjustable abutment is formed by a part of a screw in contact with a complementary abutment provided on one of the branches of the second element, this screw being capable of being displaced relative to a nut defined or carried by the end of the branch of the fastener.

Moreover, the screw and the associated branch of the tulip-shaped element are provided with braking or locking means whereby the screw is maintained in the position chosen by the user.

Preferably, the head of the screw comprises, in the region of its side adjacent its shank, a portion in the shape of a truncated pyramid which cooperates with the faces of a V-shaped recess and this head has a diametral dimension which is less than the diameter of the circle inscribed in the portion of the fastener which forms a nut.

The invention will be described in more detail hereinafter in respect of several embodiments and applications with reference to the accompanying drawings which are given by way of example and in which:

FIG. 1 is a longitudinal sectional view of a homokinetic joint provided with an axial retaining device according to the invention;

FIG. 2 is a partial view of the adjustable branch of the elastic fastener in the assembled position;

FIG. 3 is a detail view of a normal branch of the elastic fastener;

FIG. 4 is a sectional view taken on line 4—4 of FIG. 1;

FIG. 5 is a view in the direction of arrow $F_1$ of FIG. 1;

Generally, like elements in the various Figures will be designated by the same reference numerals.

Figure 6:
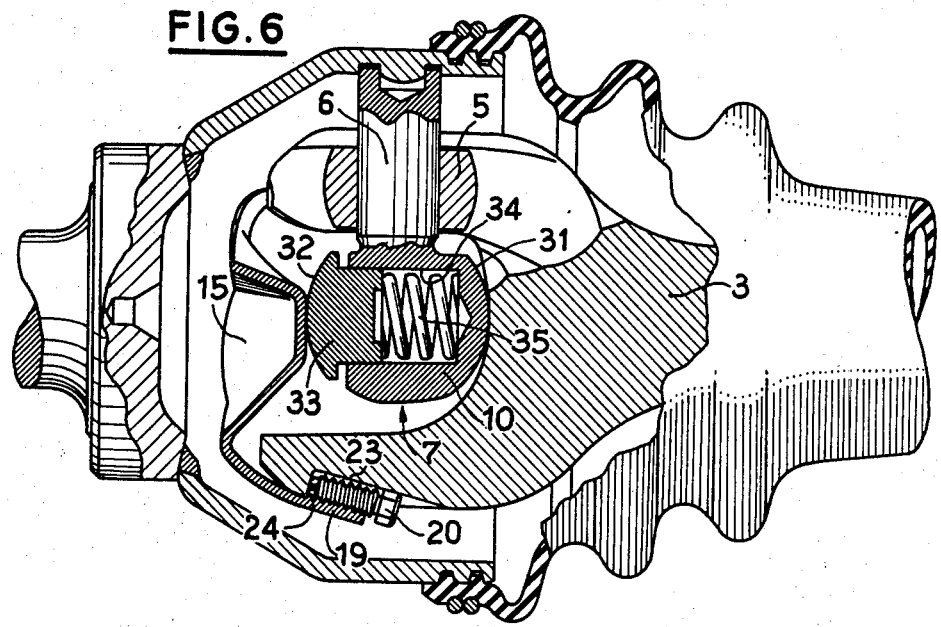
FIG. 6 is a view similar to FIG. 1 showing the device applied to a slightly different joint.

FIG. 1 shows a homokinetic joint of the tripod type which interconnects in the illustrated embodiment a wheel shaft 1 and a stub-axle 2 in an automobile vehicle. The shaft 1 terminates in a tulip element 3 comprising three branches and defining three raceways 4 of part-circular section in which rollers 5 are received. These rollers are rotatably and slidably mounted on trunnions 6 of a tripod element 7 which is rendered rigid with the stub-axle 2 by a bowl-shaped element 8. A bellows or gaiter 9 seals the joint between the bowl-shaped element 8 and the shaft 1. The hub 10 of the tripod element is spherical or part-spherical and defines two part-spherical bearing surfaces 11, 12. The surface 11 bears against a first planar surface 13 which is defined at the inner end of the tulip element and is perpendicular to the axis X—X of the latter and the surface 12 bears against a second planar surface 14 which is also perpendicular to the axis of the tulip element and is defined by a resilient fastener 15 which ensures the axial retention of the two parts of the joint.

This fastener comprises three branches two of which are shown in the illustrated embodiment and are of conventional construction and terminate in tabs 15a which are engaged in cavities 16 formed in the outer surface of two of the branches of the tulip element (see FIG. 3).

The third branch 17 of this fastener and the corresponding branch 18 of the tulip element are modified in accordance with the invention. Thus the branch 17 of the resilient fastener terminates at its free end in an inwardly rolled or folded edge portion which has an internal screwthread and constitutes a nut 19 in which a screw 20 is screwed. The cavity of the branch 18 of the tulip element in which the end of the branch 17 is received defines, on one hand, an abutment 22 which is roughly perpendicular to the axis of the screw which is itself slightly inclined relative to the axis X—X and, on the other hand, a recess 23 allowing access to the screw by means of a screw-driver (shown in dot-dash line in FIG. 1). This access is possible in the axially aligned position of the two shafts 1 and 2. The inner face 25 of this recess is flat and cooperates with the flat faces 26 of the head of the screw and brakes and maintains the latter in the chosen position (FIG. 5).

The fastener 15 is very easily placed in position. In order to facilitate this positioning, the screw is placed in its extreme unscrewed position shown in FIG. 2 so as to allow an easy clipping of the three branches of the fastener in the corresponding three cavities of the tulip element. Then the screw 20 is screwed by means of the screw-driver 24 which has a torque limit until the desired tightening is achieved. The screw is then maintained in position by the braking effect described hereinbefore (FIG. 5).

FIG. 6 shows the same principle of the adjustable tightening device applied to a slightly different axial retaining device. Thus, the surface 31 of the part-spherical surfaces is still defined by a part of the hub 10 of the tripod element but the other surface 32 is defined by a separate abutment member 33 which is slidably mounted in an axial bore 34 of the hub. The abutment member 33 is applied against the adjacent resilient fastener 15 by a spring 35 which may be a coil spring, as shown in the drawings, or any other resilient means such as a metal washer, rubber plug or the like. The adjustable abutment carried by one of the branches of the fastener is constructed in the same manner as that shown in the preceding Figures.

Figure 7:
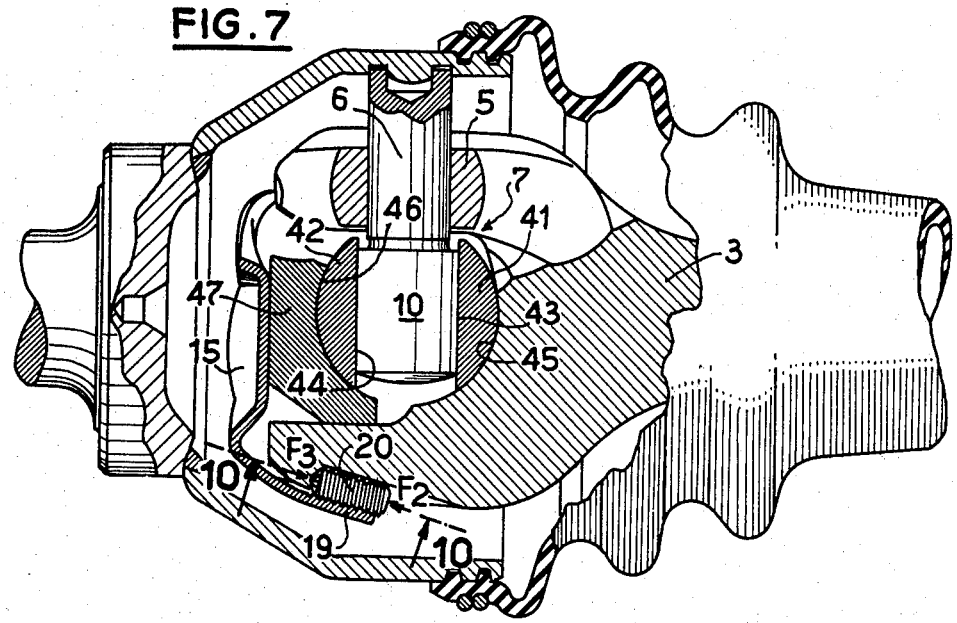
FIG. 7 is a view similar to FIG. 1 of another modification.
Figure 8:
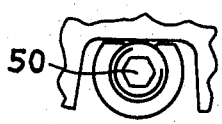
FIG. 8 is a view in the direction of arrow $F_2$ of FIG. 7.
Figure 9:
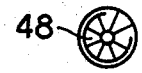
FIG. 9 is an end view of the adjusting screw in the direction of arrow $F_3$ of FIG. 7.
Figure 10:
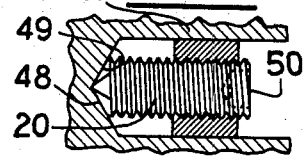
FIG. 10 is a sectional view taken on line 10—10 of FIG. 7.

FIG. 7 shows another version of the retaining device according to the invention in which the relative swivelling movements and sliding movements of the tripod element and the tulip element are ensured by means of members 41, 42 in the shape of planar-convex meniscus members which are interposed between planar surfaces 43, 44 of the hub of the tripod element and part-spherical surfaces 45, 46 formed, on one hand, in the inner end of the tulip element and, on the other hand, in a bearing member 47 which is interposed between the associated meniscus member and the resilient fastener or muzzle 15. The principle of the adjusting device is similar to that described hereinbefore except that the end 48 of the screw has a pyramidal or diamond shape (FIG. 9), the screw being braked by the contact between two of its end faces with two faces of a V-shaped recess 49 in the branch 18 of the tulip element. The screw has no head and there is provided at its free end a hexagonal socket 50. The braking is here completed by the resilient diametral tightening or clamping exerted on the screw by the end of the non-closed branch which is rolled so as to form a nut as shown in FIG. 8.

Figure 11:
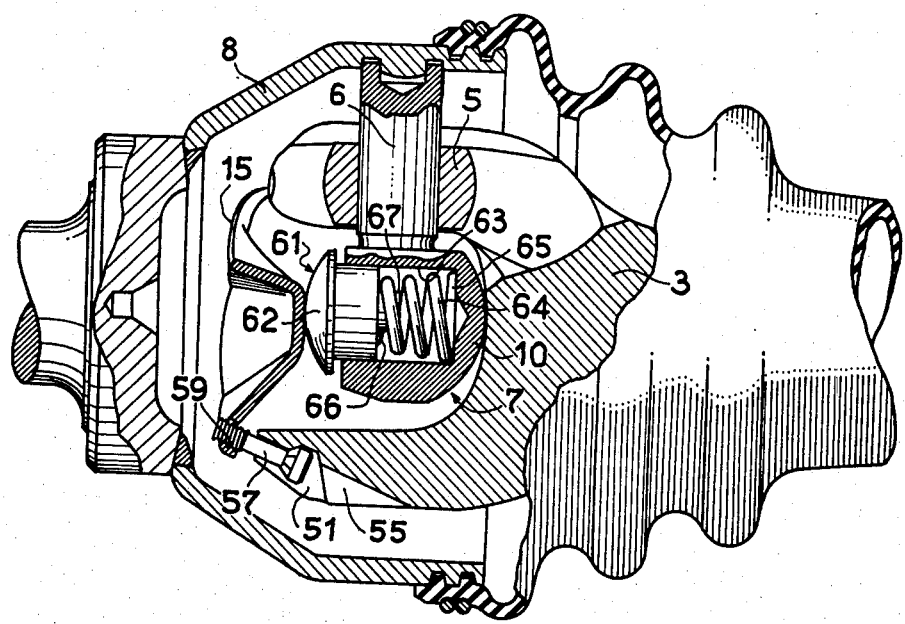
FIG. 11 is a longitudinal sectional view of a modification of the retaining device according to the invention.
Figure 12:
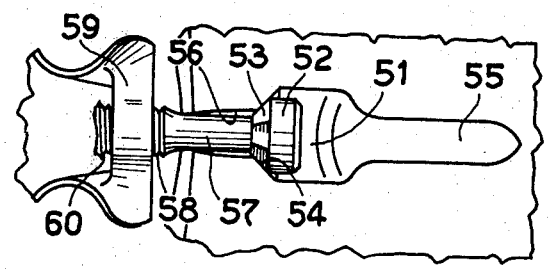
FIG. 12 is a view in the direction of arrow $F_4$ of FIG. 11 showing a detail to an enlarged scale.

FIGS. 11 and 12 show another embodiment of the adjustable tightening device according to the invention.

In this embodiment, the recess 21 provided in the branch 18 of the tulip element comprises three parts, namely:

a recess 51 for the head 52 of the adjusting screw which defines an abutment surface 53 having a V-shaped section and cooperates with said head which has flat faces 54 so as to ensure the braking thereof;

a recess 55 forming a clearance for the tightening means such as a screw-driver;

a notch 56 which allows the passage with a slight clearance of a reduced portion 57 of the shank of the screw located between the head 52 and its screwthreaded portion 58. This screwthreaded portion is received in a tapped aperture 59 which is formed at the end of the branch of the resilient fastener as shown in FIG. 12. The end 60 of the screw is spread or enlarged by deformation so as to ensure that the screw does not disengage from the tapped aperture 59.

This device operates in a manner similar to that described hereinbefore; thus, the assembly is effected by first clipping preferably the branch comprising the adjusting screw, this screw occupying its extreme unscrewed position in which the spread portion 60 abuts against the edge of the tapped aperture 59. The other branches are then clipped in position and the screw is tightened so as to obtain the desired prestressing force. Note that the assembly is still further facilitated in this embodiment since the branch of the fastener no longer straddles the adjacent branch of the tulip element, only the head 52 of the screw and the shank 57 being engaged in the recesses 51 and 56.

FIG. 11 also shows a central retaining device for taking up wear which can be mounted on an industrial scale in this arrangement owing to the presence of the adjustable resilient fastener. This device comprises, as in the case shown in FIG. 6, a member 61 defining a part-spherical dome 62 and slidably mounted in a bore 63 in the jub of the tripod element. The spring 64 which biases this member against the resilient fastener 15 comprises an end coil 65 whose free diameter exceeds that of the bore 63 and another end coil 66 whose inside diameter is such that this coil is a tight fit on a stud 67 carried by the abutment 61. Thus, upon the assembly of the abutment and the spring they remain in position and allow the fastener to be positioned without danger of the fastener falling away, this fastener at the moment of the tipping thereof being located inside the bowl-shaped element 8 and hidden by the main element 3.

Figure 13:
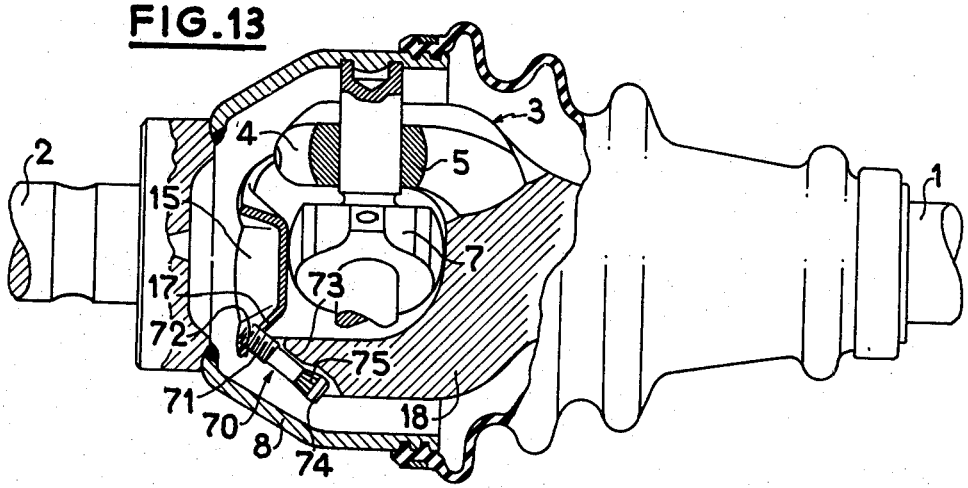
FIG. 13 is a side elevational view and a partial sectional view of a tripod joint provided with another modification of an axial retaining device according to the invention.

In FIG. 13 the branch 17 of the fastener 15 and the corresponding branch 18 of the tulip element comprise complementary abutment means formed by a screw 17 whose screwthreaded portion 71 is received in a tapped aperture 72 of the resilient fastener forming a nut and by a cavity 73 defining a V-sectioned abutment surface which cooperates with the head 74 of the screw which is provided with flat faces 75 adapted to ensure the braking thereof.

The head 74 of the screw has a diametral dimension less than the inside diameter of the tapped aperture 72 formed in the branch 17 of the fastener and this screw comprises at the free end of its screwthreaded portion means for retaining it relative to the fastener. These means will be described hereinafter.

The reduction in the diameter of the head of the screw is accompanied by a reduction in the angle $\alpha$ which all the flat faces 75 make with the axis of the screw, this angle being advantageously between 10° and 20°. This moreover permits increasing the number n of these flat faces, for example up to twelve or more flat faces, so as to improve the precision of the adjustment without diminishing the braking effect since this braking effect corresponds to the resistance which opposes the rearward movement of the screw when, upon application of an unscrewing force, the edges between two flat faces bear against the two V-section bearing faces of the cavity of the tulip element.

Figure 15:
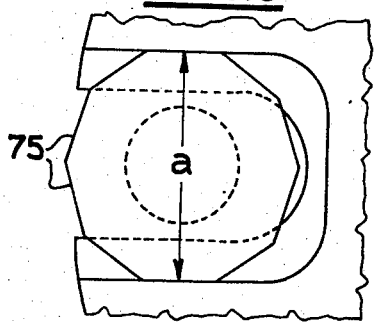
FIGS. 14 and 15 are respectively an elevational view and a sectional view taken on line 15—15 of FIG. 14, to an enlarged scale of the relative arrangement of the head of the screw and of the recess formed in the tulip element.
Figure 14:
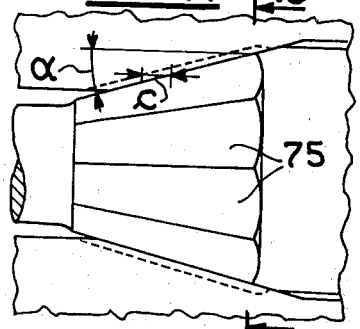

This system is illustrated in FIGS. 14 and 15 in which a designates the maximum diameter of the head of the screw between two flat faces and c the distance that the screw must move axially rearwardly to be capable of turning through one division. There exists between c and a the following relation:

$$c = \frac{a}{2 \tan \alpha} \left( \frac{1}{\cos \frac{180}{n}} - 1 \right)$$

By way of example, if
a = 5.7 mm,
n = 12
α = 12°
there is obtained:
c = about 0.5 mm.
If the pitch of the screw is 0.75 mm, the adjustment can be effected with a precision of 0.75 mm/24 = 0.03 mm.

The precision in the axial position of the centre of the fastener, on which the value of the pre-stressing depends for axially retaining is then equal to 0.03/3 = 0.01 mm.

FIGS. 16 to 20 show various embodiments of axial retaining means provided on the screw. It is important to note that, owing to the relation which exists between the radial dimension of the screw head and that of the tapped aperture formed in the fastener, these axial retaining means may be formed in the course of the manufacture of this screw and before its assembly with the fastener. This permits the use of a high-quality hardened steel for this screw since the retaining means may be produced completely before the hardening.

Figure 16:
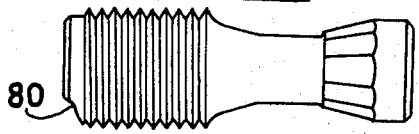
FIGS. 16 to 20 are views of different embodiments of the screw.

In the embodiment shown in FIG. 16, the retaining means are formed by a peripheral punching 80 provided at the end of the screwthreading and obtained by a deformation of the metal before the hardening.

Figure 17:
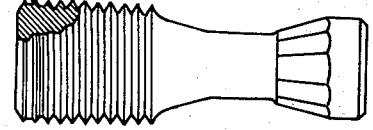

In the screw shown in FIG. 17, an incomplete screwthread 81 is formed at the end of the screw by means of a shorter thread rolling tool or a rolling tool in which the crests of the thrads have been truncated.

Figure 18:
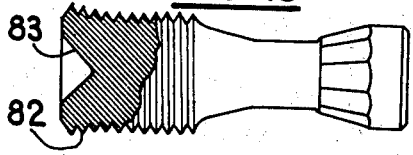
Figure 19:
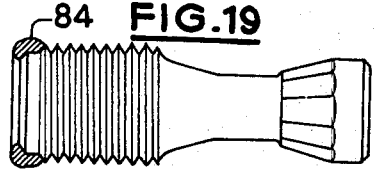
Figure 20:
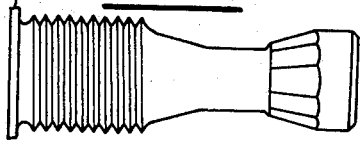

In FIG. 18, there is provided an enlargement 82 of the screwthreaded end portion of the screw obtained by a punching operation 83 on the axis of the screw.

In all these embodiments, the same advantages are obtained, which reside mainly in the fact that the screw may be placed in position by introducing the head of the screw in the tapped aperture of the fastener, this screw comprising, as manufactured, retaining means at the end of its screwthreaded portion.

Moreover, the reduction in the angle made between the flat faces of the screw head and the axis of the latter and the resulting increase in the number of these flat faces results in an improved precision in the adjustment of the pre-stressing force.

Various modifications may be made in these various constructions without departing from the scope of the invention as defined in the claims. Thus, if it is preferred, for reasons of simplicity and cost, to provide adjusting means on only a single one of the branches of the resilient fastener, such means may however be provided on two or more of these branches. Moreover, the very construction of the adjustable complementary means provided on the resilient fastener and the tulip element may be subjected to many other modifications.

Having now described my invention what I claim as new and desire to secure by Letters Patent is:

1. In a device for retaining a first element inside a second element which is substantially in the shape of a tulip and has a plurality of branches, said device comprising a resilient fastener having a plurality of radially extending branches some of which branches of the fastener have ends engaged in cavities in the branches of the second element so as to retain the fastener on the second element with the first element interposed between the fastener and the second element; the improvement comprising a free radially outer end portion of at least one of the branches of the fastener, a first abutment means movably combined with said radially outer end portion, a second abutment means on an associated branch of said branches of the second element, the first abutment means being cooperative with the second abutment means to hold the fastener on the second element in cooperation with the retaining actions of said ends engaged in said cavities, and means for adjusting the position of the first abutment means relative to said end portion whereby to adjust the position of retention of the fastener relative to the second element.

2. A device as claimed in claim 1, wherein said first abutment means and said means for adjusting the position of the first abutment means comprise a screw and means defining a nut which is carried by said end portion of said one of the branches of the fastener, the screw being screwthreadedly engaged with the nut, the second abutment means comprises means defining an abutment surface on said associated branch of the second element and the screw has a portion engaged with said abutment surface.

3. A device as claimed in claim 2, wherein the screw and said associated branch of the second element comprise means for maintaining the screw in a selected position relative to the nut.

4. A device as claimed in claim 2 or 3, wherein the portion of the screw defines an end surface of the screw which is in abutting relation to said abutment surface.

5. A device as claimed in claim 2 or 4, wherein said end surface has a substantially pyramidal shape and said abutment surface defines a substantially V-section cavity in said associated branch of the second element.

6. In a device for retaining a first element inside a second element which is substantially in the shape of a tulip and has a plurality of branches, said device comprising a resilient fastener having a plurality of branches some of which branches of the fastener have ends engaged in cavities in the branches of the second element so as to retain the fastener on the second element with the first element interposed between the fastener and the second element; the improvement comprising a free radially outer end portion of at least one of the branches of the fastener, a first abutment means movably combined with said radially outer end portion, a second abutment means on an associated branch of said branches of the second element, the first abutment means being cooperative with the second abutment means to hold the fastener on the second element in cooperation with the retaining actions of said ends engaged in said cavities, and means for adjusting the position of the first abutment means relative to said end portion whereby to adjust the position of retention of the fastener relative to the second element, the first abutment means and said means for adjusting the position of the first abutment means comprising a screw and means defining a nut which is carried by said end portion of said one of the branches of the fastener, the screw being screwthreadedly engaged with the nut, the second abutment means comprising means defining an abutment surface on said associated branch of the second element, the screw and said associated branch of the second element comprising means for maintaining the screw in a selected position relative to the nut, and the screw comprising a shank and a head and a head portion which is located on a side of the head adjacent the shank and is in abutting relation to said abutment surface.

7. A device as claimed in claim 6, wherein said means for maintaining the screw in a selected position comprises flat faces on said side of the head and a substantially V-section cavity in said associated branch of the second element which cavity defines surfaces with which the flat faces of the head are capable of engaging.

8. A device as claimed in claim 7, wherein the head of the screw has an overall diametral dimension less than the diameter of a circle inscribed in said means defining the nut.

9. A device as claimed in claim 7, wherein said flat faces formed on the head make with the axis of the screw an angle of about 10°–20°.

10. A device as claimed in any one of the claims 6 to 9, comprising a peripheral deformation of an end of the shank remote from the head for retaining the screw relative to the fastener.

11. A device as claimed in any one of the claims 6 to 9, wherein the screw comprises in the vicinity of an end of the shank remote from the head an incomplete screwthreading for retaining the screw relative to the fastener.

12. A device as claimed in any one of the claims 6 to 9, wherein the screw comprises in the vicinity of an end of the shank remote from the head an enlarged portion for retaining the screw relative to the fastener.

13. A device as claimed in any one of the claims 6 to 9, wherein the screw comprises in the vicinity of an end of the shank remote from the head an addition of a hard material attached to the screw.

14. A device as claimed in any one of the claims 6 to 9, wherein the screw comprises in the vicinity of an end of the shank remote from the head an outwardly projecting shoulder.

15. A device as claimed in claim 3, wherein the means for maintaining the screw in the selected position comprise flat faces on the screw and a recess which is in said associated branch of the second element and defines a planar surface in which any of said flat faces is capable of engaging.

16. A device as claimed in claim 2 or 3, wherein said nut is defined by an end portion of the branch of the fastener.

17. In a device for retaining a first element inside a second element which is substantially in the shape of a tulip and has a plurality of branches, said device comprising a resilient fastener having a plurality of branches having ends engaged in cavities in the branches of the second element; the improvement comprising a free end portion of at least one of the branches of the fastener, an adjustable first abutment means combined with said end portion, and a complementary second abutment means on an associated branch of said branches of the second element, the first abutment means being cooperative with the second abutment means to hold the fastener on the second element, said associated branch of the second element defining a recess allowing access of a tool for adjusting the adjustable first abutment means.

18. A device as claimed in claim 3 or 6, wherein the branch of the second element comprises a recess which allows the passage of the screw, said one branch of the fastener having an end portion which defines the nut and terminates short of so as not to overlie said associated branch of the second element.

19. A device as claimed in claim 6, wherein the branch of the second element comprises a recess which allows the passage of the screw, said one branch of the fastener having an end portion which defines the nut and terminates short of so as not to overlie said associated branch of the second element, said recess having a first portion receiving the shank and a second portion larger than the first portion of the recess for receiving the head, and the screw terminates in an end portion which is remote from the head and retains the screw relative to the nut.

20. A device as claimed in any one of the claims 1, 3 or 6, wherein the adjustable first abutment means comprises a member which extends obliquely relative to the axis of the second element.

21. A device as claimed in claim 17, wherein said first abutment means comprises a screw and means defining a nut which is carried by said end portion of said one of the branches of the fastener, the screw being screwthreadedly engaged with the nut, the second abutment means comprises means defining an abutment surface on said associated branch of the second element and the screw has a portion engaged with said abutment surface.

22. A device as claimed in claim 21, wherein the screw and said associated branch of the second element comprise means for maintaining the screw in a selected position relative to the nut.

* * * * *